United States Patent [19]

Bühler et al.

[11] Patent Number: 4,505,856

[45] Date of Patent: Mar. 19, 1985

[54] AZO DYESTUFF DISCHARGEABLE TO WHITE

[75] Inventors: Ulrich Bühler, Schöneck; Joachim Ribka, Offenbach am Main-Bürgel; Horst Tappe, Dietzenbach; Kurt Roth, Hofheim, all of Fed. Rep. of Germany

[73] Assignee: Cassella Aktiengesellschaft, Frankfurt am Main, Fed. Rep. of Germany

[21] Appl. No.: 503,513

[22] Filed: Jun. 10, 1983

Related U.S. Application Data

[60] Division of Ser. No. 386,916, Jun. 10, 1982, Pat. No. 4,406,661, which is a continuation of Ser. No. 268,128, May 28, 1981, abandoned.

[51] Int. Cl.³ .................. C09B 29/033; C09B 29/039; C09B 29/085; C09B 29/09
[52] U.S. Cl. .................................... 534/753; 534/765; 534/778; 534/791; 534/795; 534/84
[58] Field of Search ............ 260/205, 206, 207, 207.1, 260/152, 158, 155, 186, 187, 207.5

[56] References Cited

U.S. PATENT DOCUMENTS

| | | | |
|---|---|---|---|
| 704,826 | 7/1902 | Herzberg et al. | 260/206 |
| 1,650,090 | 11/1927 | Neelmeier et al. | 260/191 |
| 3,923,780 | 12/1975 | Harmon et al. | 260/205 |
| 4,009,158 | 2/1977 | Altermatt | 260/205 |

*Primary Examiner*—Floyd D. Higel
*Attorney, Agent, or Firm*—Connolly and Hutz

[57] ABSTRACT

Azo dyestuff free from groups imparting solubility in water are used in the process for the production of white or variously colored designs on a colored substrate on textile material wherein the dyestuff is dischargeable to white and is of the formula

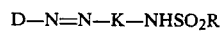

$$D-N=N-K-NHSO_2R$$

wherein
wherein D is 6-nitrobenzthiazol-2-yl, 5-nitrobenzisothiazol-3-yl, a substituted phenyl, a substituted thiazole or a substituted thiophene moiety;
K is a 1,4-phenylene, 1,4-naphthylene, 2,5-thiazolylene or 2,5-thienylene; and
R is alkyl, substituted alkyl, alkenyl, substituted alkenyl, phenyl or substituted phenyl.

3 Claims, No Drawings

AZO DYESTUFF DISCHARGEABLE TO WHITE

This application is a division of application Ser. No. 386,916 filed June 10, 1982, now U.S. Pat. No. 4,406,661, which is a continuation of application Ser. No. 268,128 filed May 28, 1981 now abandoned.

The present invention relates to a process for the production of discharge reserve prints on textile materials, particularly those containing to a preponderant extent hydrophobic fibres, preferably polyester fibres, or consisting of such fibres, by impregnating the materials with dye liquors containing, in addition to customary dyeing and padding auxiliaries, dyestuffs which are dischargeable to white and, if appropriate, dyestuffs which are resistant to discharging agents, drying or incipiently drying the padded materials and then printing on an alkaline discharge reserve paste which, in addition to the discharging agent, also contains, if desired, dyestuffs which are resistant to discharging agents, and subsequently subjecting the materials to a heat treatment at temperatures from 100° to 230° C., the dyestuffs dischargeable to white which are employed being the dyestuffs characterised in claim 1 by the formula I and the discharging agent which is employed being a base of the type indicated in claim 1.

In the field of textile printing, the production of white or coloured designs with sharp edges on a dark-coloured background has always been a problem. In particular, if it is desired to produce a filigree-like design on a dark substrate, direct printing of the textile material will not work at all. In order to produce such designs, it has been known for a long time to print a discharge paste in the desired pattern onto a deep background dyeing produced by means of a dyestuff dischargeable to white and then to destroy the dyestuff on the areas printed with the discharge paste, by a dry or wet heat treatment. After the prints thus obtained have been washed out, the desired design is obtained as white on a dark ground. It is also already known to add to the discharge printing pastes dyestuffs which are resistant to the discharging agent. In this case, at the same time as the ground dyeing is destroyed, the textile material is dyed on the printed areas by means of the indestructible dyestuff. Coloured prints on a dark ground are obtained in this case. Coloured prints on a dark ground can also be obtained if the dark ground is produced using a mixture of a dischargeable dyestuff and a non-dischargeable dyestuff of another colour, by introducing both types of dyestuff into the padding liquor.

If these known processes are applied to synthetic fibre materials or textile materials which preferably consist of hydrophobic, synthetic fibres, a problem arises in that it is very difficult to discharge polyester fibres which have been dyed with, for example, disperse dyestuffs. Once disperse dyestuffs have been fixed, that is to say dissolved, in the polyester fibre, they are largely withdrawn from the reach of aqueous agents and thus also from attack by aqueous discharge pastes. In the production of discharge prints on textile materials containing or consisting of hydrophobic fibres, the known discharge printing process is, therefore, modified by first padding the textile material with a dye liquor containing disperse dyestuff and drying or incipiently drying it, but no fixing of the dyestuff, that is to say solution of the dyestuff in the hydrophobic fibre, must take place. The desired design is then printed on the dried or incipiently dried padded fabric by means of the discharge printing paste and the padded and printed fabric is then subjected to a heat treatment, in the course of which the ground dyestuff at the same time migrates into the polyester on the areas which have not been printed, that is to say it becomes fixed, and the dyestuff is destroyed on the printed areas, that is to say no dyeing takes place. In view of this mechanism, this process is also described as discharge reserve printing.

The process of discharge reserve printing, which in itself is simple, contains a number of technical difficulties which frequently make its use difficult. Thus, it is usually not easy to destroy the ground dyestuff completely by means of the discharging agent. If this is not achieved, there remains on the discharged areas a coloured residue which has a hue capable of varying between yellow-brown and dull violet or reddish-tinged grey shades and which soils the white ground on the discharged areas. This produces white discharges with an untidy appearance or, in the event that a coloured discharge is to be produced, imparts a false shade to the dyestuff which is resistant to discharging agents. To overcome this difficulty, discharge pastes are used which contain relatively strong reducing agents or oxidising agents, such as, for example, sodium dithionite, in combination with an alkali, alkali metal formaldehydesulphoxylates or even heavy metal salts, such as, for example, tin-II chloride. Although it is usually possible to achieve a satisfactory white discharge print using such strong discharging agents, damage to the fibre material frequently occurs, particularly if the polyester fibre also contains accompanying fibres, such as, for example, cellulose fibres. Furthermore, these discharging agents are usually not cheap and, in the case of heavy metal discharging agents, they constitute an additional environmental pollution and/or cause additional outlay when the effluents are purified. In addition, there are only relatively few types of dyestuff which are resistant to such discharging agents, and thus there is a relatively limited choice of dyestuffs which are resistant to discharging agents and which can be used for the production of coloured discharges.

Disperse dyestuffs for the background dyeing which can be discharged to a pure white by agents with the mildest possible action are required to overcome these difficulties. Disperse dyestuffs containing at least 2 esterified carboxyl groups in the molecule have been disclosed in German Offenlegungsschriften Nos. 2,612,740, 2,612,741, 2,612,742, 2,612,790, 2,612,791 and 2,612,792. Dyestuffs of this type are saponified when treated with aqueous alkalis, with the formation of alkali-soluble dyestuffs containing carboxyl groups. The use of dyestuffs of this type as disperse dyestuffs for dyeing polyester materials has the advantage that residues of dyestuff which have not been fixed can be washed off the textile material by a simple treatment with agents having an alkaline reaction. It is also known that residues of dyestuff which have not been fixed can be removed readily, by treating the fibre with alkali, from dyeings made with disperse dyestuffs containing pyridone derivatives as the coupling component. However, so far as pyridone dyestuffs are concerned, these dyestuffs, which are soluble in aqueous alkalis, have the disadvantage that they can essentially be employed exclusively for yellow or reddish-tinged yellow shades, and so far as dyestuffs containing esterified carboxyl groups are concerned, these dyestuffs have the disadvantage that, after the ester groups have been saponified, they have a certain affinity for hydrophilic fibres, such as, for example, wool, cotton or polyamide fibres, and stain or soil these fibres. In addition, the diazo or coupling components required for the manufacture of dyestuffs containing carboxylic acid ester groups are not established substances in large-scale chemical industry, but have to be made specially for these types of dyestuffs, which as a rule is so expensive as to be uneconomic. It has, therefore, not been possible to satisfy, by means of the abovementioned types of dyestuff, the need to employ, in the process for discharge reserve printing on hydrophobic textile materials, disperse dyestuffs which can be discharged to pure white under relatively mild discharge conditions.

In addition, German Offenlegungsschrift No. 2,836,391 has already disclosed a process which makes it possible to produce discharge reserve prints on polyester fibre material, and in which substances having an alkaline reaction are employed as discharging agents in combination with special disperse dyestuffs which can be discharged to white. However, the process has the disadvantage that the shades which can be produced are essentially limited to the blue and blue-violet ranges. It is not possible to prepare new dyestuffs for the important red and claret ranges by using as a model the structure of the dyestuffs employed in this reference.

It has now been found that the process of alkaline discharge printing can also be extended to these hitherto inaccessible ranges of shades, if, in carrying out the discharge reserve printing process on textile materials consisting entirely or predominantly of hydrophobic, synthetic fibres, these materials are impregnated in a manner which is in itself known with dye liquors containing, in addition to customary dyeing and padding auxiliaries, dyestuffs which are dischargeable to white and, if appropriate, dyestuffs which are resistant to discharging agents, if the impregnated fabrics are dried or incipiently dried and are printed in the desired design with a discharge reserve paste which, if desired, also contains, besides the discharging agent, a dyestuff resistant to discharging agents, and are then subjected to a heat treatment at 100° to 230° C., and if the dyestuffs which are dischargeable to white which are employed are those of the formula I

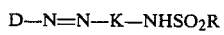

D—N=N—K—NHSO$_2$R　　　(I)

wherein D is a radical of the formula II

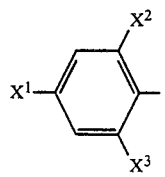

in which $X^1$ and $X^2$ independently of one another denote halogen, particularly fluorine, chlorine or bromine, nitro, cyano, trifluoromethyl, alkyl having 1 to 4 C atoms or alkylsulphonyl which has 1 to 4 C atoms and can optionally be substituted by hydroxyl, methoxy, ethoxy, hydroxyethoxy, methoxyethoxy, ethoxyethoxy, chlorine, bromine or cyano, or denote phenylsulphonyl which can optionally be substituted by methoxy, methyl, chlorine, bromine or nitro, or denote alkylcarbonyl which has 1 to 4 C atoms in the alkyl radical and which can optionally be substituted by hydroxyl, methoxy, ethoxy, hydroxyethoxy, methoxyethoxy, ethoxyethoxy, chlorine, bromine or cyano, or denote benzoyl wherein the phenyl radical can also be substituted by alkyl having 1 to 4 C atoms, alkoxy having 1 to 4 C atoms, nitro or halogen, or denote alkoxycarbonyl which has 1 to 4 C atoms in the alkoxy radical and which can optionally be substituted by phenyl hydroxyl, alkoxy having 1 to 4 C atoms or alkylcarbonyloxy having 1 to 4 C atoms in the alkyl radical, or denote phenylazo which can be monosubstituted, disubstituted or trisubstituted, preferably monosubstituted or disubstituted, by cyano, nitro, chlorine, bromine, trifluoromethyl, alkyl having 1 to 4 C atoms, alkoxy having 1 to 4 C atoms, or alkoxycarbonyl having 1 to 4 C atoms in the alkoxy group, and $X^3$ is hydrogen or has one of the meanings of $X^1$; or D is a radical of the formula III

in which $X^4$ denotes nitro, cyano, alkylsulphonyl having 1 to 4 C atoms in the alkyl group, or phenylsulphonyl which can optionally be substituted by methoxy, methyl, chlorine, bromine or nitro, or denotes alkoxycarbonyl having 1 to 4 C atoms in the alkyl group, or denotes phenoxycarbonyl which can optionally be substituted in the phenyl radical by alkyl having 1 to 4 C atoms, alkoxy having 1 to 4 C atoms, nitro, fluorine, chlorine or bromine, and $X^5$ denotes hydrogen, alkyl having 1 to 4 C atoms, or phenyl which can optionally be substituted by alkyl having 1 to 4 C atoms, alkoxy having 1 to 4 C atoms, nitro or halogen; or D is a radical of the formula IV

in which $X^6$ denotes bromine, chlorine, nitro, cyano, alkoxycarbonyl having 1–4 C atoms in the alkyl group, alkylcarbonyl having 1–4 C atoms in the alkyl group or alkylsulphonyl having 1–4 C atoms in the alkyl group, and $X^7$ denotes nitro, cyano, chlorine, bromine, alkylsulphonyl having 1–4 C atoms in the alkyl group, or alkoxycarbonyl having 1–4 C atoms in the alkoxy group; or D is 6-nitrobenzthiazol-2-yl or 5-nitrobenzisothiazol-3-yl, K denotes the radical of a coupling component of the 1,4-phenylene, 1,4-naphthylene, 2,5-thiazolyl or 2,5-thienyl series and R denotes alkyl which has 1–8 C atoms and which can optionally be monosubstituted by hydroxyl, chlorine, bromine, cyano, alkoxy or hydroxyalkoxy having 1–4 C atoms, alkenoxy having 3 or 4 atoms, cycloalkoxy having 5 or 6 C atoms, alkylcarbonyloxy having 2 to 4 C atoms, or phenyl, phenoxy or benzoyloxy, each of which is, in addition, optionally monosubstituted or disubstituted in the phenyl nucleus by alkyl having 1–4 C atoms or alkoxy having 1 to 4 C atoms, preferably methyl or methoxy, or by chlorine, bromine or cyano, and R denotes alkyl having 1–8 C atoms which, in addition to the said substituents, can optionally also be substituted by a hydroxyl group; or R denotes alkenyl which has 2–4, preferably 3 or 4, C atoms and which can optionally be substituted by hydroxyl, methoxy, ethoxy, chlorine, bromine or cyano, or R denotes phenyl which can be trisubstituted, disubstituted or monosubstituted by alkyl having 1 to 4 C atoms, hydroxyalkyl having 1 to 4 C atoms, alkoxyalkyl or hydroxyalkoxyalkyl having a total of 2 to 8 C atoms, alkanoyloxyalkyl having a total of 2 to 8 C atoms, alkoxy having 1 to 4 C atoms, hydroxyalkoxy having 1 to 4 C atoms, alkoxyalkoxyalkoxy or hydroxyalkoxyalkoxy having a total of 2 to 8 C atoms, alkanoyloxyalkoxy having a total of 2 to 8 C atoms, chlorine, bromine or nitro, and which can carry a methyl group as a fourth substituent.

A suitable alkaline discharging agent is, in principle, any base which produces a pH value of at least 8 in a 5% strength aqueous solution; alkali metal hydroxides or salts of alkali metals with weak acids, such as, for example, alkali metal carbonates, bicarbonates, phosphates or borates, are particularly suitable.

A particularly preferred alkaline discharging agent for the process according to the invention is $Na_2CO_3$.

Amongst the dyestuffs of the formula I in which D is a radical of the formula II, dyestuffs which are preferred for the process according to the invention are those in which $X^1$ denotes halogen, particularly fluorine, chlorine or bromine, nitro, cyano, trifluoromethyl, or alkylsulphonyl which has 1 to 4 C atoms and which can optionally be substituted by hydroxyl, methoxy, ethoxy, hydroxyethoxy, methoxyethoxy, ethoxyethoxy, chlorine, bromine or cyano, or denotes phenylsulphonyl which can optionally be substituted by methoxy, methyl, chlorine, bromine or nitro, or denotes alkylcarbonyl which has 1 to 4 C atoms in the alkyl radical and can optionally be substituted by hydroxyl, or denotes benzoyl wherein the phenyl radical can also be substituted by alkyl having 1 to 4 C atoms, alkoxy having 1 to 4 C atoms, nitro or halogen, or denotes alkoxycarbonyl which has 1 to 4 C atoms in the alkoxy radical and which can optionally be substituted by phenyl, hydroxyl, alkoxy having 1 to 4 C atoms, or alkylcarbonyloxy having 1 to 4 C atoms in the alkyl radical, $X^2$ is fluorine, chlorine, bromine, nitro, cyano, alkylsulphonyl having 1 to 4 C atoms, particularly methylsulfonyl, alkoxycarbonyl having 1 to 4, particularly 1 or 2, C atoms in the alkoxy radical, or phenylsulphonyl and $X^3$ is hydrogen, chlorine, bromine, nitro or cyano.

The strongly electron-attracting substituents nitro, cyano, alkylsulphonyl having 1 to 4, particularly 1 or 2, C atoms, alkoxycarbonyl having 1 to 4, particularly 1 or 2, C atoms in the alkoxy radical, phenylsulphonyl are particularly preferred for $X^1$. Dyestuffs of the formula I in which D is a radical of the formula II are also particularly suitable for the process according to the invention if $X^3$ is not hydrogen or if $X^2$ and $X^3$ are the same or different and signify hydrogen, nitro or cyano.

Dyestuffs, according to the invention, in which D denotes a radical of the formula III or IV wherein the symbols $X^4$, $X^5$ and $X^6$ have the abovementioned meanings, are also very advantageous for use in the process according to the invention. The dyestuffs in which D is a radical of the formula III are particularly preferred if $X^4$ is the nitro group; dyestuffs in which D is a radical of the formula IV are particularly preferred if one of the substituents $X^6$ or $X^7$ is nitro or cyano.

Dyestuffs of the formula V

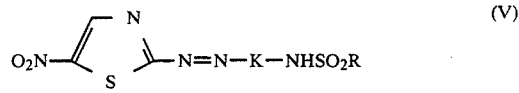

$$O_2N-\underset{S}{\underset{|}{\overset{N}{\diagdown}}}-N=N-K-NHSO_2R \quad (V)$$

wherein K and R have the above meanings are also preferred for the present invention, particularly if K is the radical of a coupling component of the 1,4-phenylene series.

Suitable substituents for the alkyl and alkoxy radicals contained in the substituents represented by $X^1$ to $X^6$ are preferably hydroxyl and alkoxy having 1 or 2 C atoms, particularly hydroxyl, and suitable substituents for phenyl radicals are nitro, cyano, chlorine, bromine and alkoxycarbonyl having 1 to 4 C atoms, particularly nitro, cyano and chlorine.

Radicals of a coupling component of the 1,4-phenylene series which are represented by K correspond to the formula VI

$$\underset{Y^2}{\overset{Y^1}{\diagup}}\text{—} \quad (VI)$$

wherein $Y^1$ denotes hydrogen, halogen, particularly fluorine, chlorine or bromine, or alkyl which has 1 to 4 C atoms and which can be substituted by halogen, particularly chlorine or bromine cyano, hydroxyl, alkanoyloxy having 1 to 4 C atoms, alkoxy having 1 to 4 C atoms or alkoxycarbonyl having 1 to 4 C atoms in the alkoxy radical; or $Y^1$ denotes alkoxy which has 1 to 4 C atoms and which can be monosubstituted by halogen, particularly chlorine or bromine, cyano, hydroxyl, alkoxy or hydroxyalkoxy having 1 to 4 C atoms, alkanoyloxy having 1 to 4 C atoms, or alkoxycarbonyl having 1 to 4 C atoms in the alkoxy radical, or which can be disubstituted by the combination OH/OH or OH/chlorine, and $Y^2$ has one of the meanings indicated for $Y^1$ or denotes alkylcarbonylamino which has 1 to 4 C atoms in the alkyl radical and which can optionally be substituted by chlorine, bromine, hydroxyl, alkoxy or hydroxyalkoxy having 1 to 4 C atoms, alkanoyloxy having 1 to 4 C atoms, phenoxy or alkoxycarbonyl having 1 to 4 C atoms, or $Y^2$ denotes benzoylamino which can optionally be monosubstituted or disubstituted in the phenyl nucleus by hydroxyl, chlorine, alkyl having 1 to 4 C atoms, or alkoxy having 1 to 4 C atoms; or $Y^2$ denotes alkylsulphonylamino which has 1 to 4 C atoms and which can optionally be substituted by hydroxyl or alkoxy having 1 to 4 C atoms, or $Y^2$ denotes phenylsulphonylamino which can optionally be monosubstituted or disubstituted in the phenyl nucleus by hydroxyl, chlorine, alkyl having 1 to 4 C atoms, or alkoxy having 1 to 4 C atoms.

Dyestuffs of the formula I which are preferred for the process according to the invention are those which have a 1,4-phenylene radical which is represented by K and in which $Y^1$ is hydrogen, alkyl having 1 to 4, particularly 1 or 2, C atoms, methoxy or alkoxy which has 2 to 4, particularly 2 or 3, C atoms and which can optionally be monosubstituted by chlorine, hydroxyl, alkoxy having 1 or 2 C atoms or hydroxyalkoxy having 2 or 3 C atoms, or, which, if it has at least 3 C atoms, can also be disubstituted by the combination OH/OH or Cl/OH, and also those dyestuffs in which $Y^2$ is one of the preferred radicals represented by $Y^1$, and particularly those dyestuffs in which $Y^2$ is an alkylcarbonylamino radical, particularly acetylamino or propionylamino, which can optionally be substituted as indicated above, and, in particular, can be substituted by chlorine, hydroxyl, alkoxy having 1 or 2 C atoms, or phenoxy.

Radicals of a coupling component of the 1,4-naphthylene series which are represented by K correspond to the formula VII

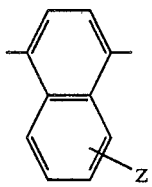

(VII)

wherein Z denotes hydrogen, halogen, particularly fluorine, chlorine or bromine, or alkyl which has 1 to 4 C atoms and which can be substituted by halogen, particularly chlorine or bromine, cyano, hydroxyl, alkanoyloxy having 1 to 4 C atoms, alkoxy having 1 to 4 C atoms, or alkoxycarbonyl having 1–4 C atoms in the alkoxy radical; or Z denotes alkoxy which has 1 to 4 C atoms and which can be monosubstituted by halogen, particularly chlorine or bromine, cyano, hydroxyl, alkoxy or hydroxyalkoxy having 1 to 4 C atoms, alkanoyloxy having 1 to 4 C atoms or alkoxycarbonyl having 1 to 4 C atoms in the alkoxy radical, or which can also be disubstituted by the combination OH/OH or OH/chlorine.

Dyestuffs of the formula I which are preferred for the process according to the invention are those which have a 1,4-naphthylene radical which is represented by K and in which Z denotes hydrogen, alkyl having 1 to 4, preferably 1 or 2, C atoms, methoxy or alkoxy which has 1 to 4, particularly 2 or 3, C atoms and which can be optionally monosubstituted by chlorine, hydroxyl, alkoxy having 1 or 2 C atoms, or hydroxyalkoxy having 2 or 3 C atoms, or which, if it has 3 C atoms, can also be disubstituted by the combination OH/OH or Cl/OH.

Preferred substituents R of the dyestuffs of the formula I which are to be employed in accordance with the invention are alkyl having 1 to 4 C atoms which can be monosubstituted by hydroxyl or chlorine; and alkenyl having 2 to 4, preferably 3 or 4, C atoms, and especially phenyl which can be trisubstituted, disubstituted or monosubstituted by alkyl having 1 or 2 C atoms, alkoxy having 1 or 2 C atoms, chlorine, bromine or nitro, preferably nitro, methyl or methoxy, and which can carry a methyl group as a fourth substituent.

Dyestuffs of the formula I which are particularly preferred for the process according to the invention are those which contain several of the abovementioned preferred characteristics.

Mixtures composed of two or three dyestuffs of the general formula I are particularly advantageous from a technical point of view in relation to the dyestuff yield and affinity of the prints. Such dyestuff mixtures, according to the invention, contain 10 to 90%, preferably 30 to 70%, of a particular dyestuff of the formula I.

The process according to the invention is carried out in the manner which is in itself known, for example from German Offenlegungsschrift No. 2,836,391, by padding textile materials with dye liquors containing one or more dyestuffs of the formula I, as well as the known customary dyeing auxiliaries, such as, for example, dispersing agents, wetting agents, anti-foaming agents and padding auxiliaries, squeezing out the padded fabric webs to a liquor pick-up of 50 to 120% and subsequent drying. The fabric webs which have been prepared in this way are then printed with a discharge reserve paste containing, as the discharging agent, a base which produces a pH value of at least 8 in a 5% strength aqueous solution, and also the known additives which are customary in printing pastes for textile printing, particularly thickeners. The padded and printed fabric webs are then subjected to a heat treatment at between 100° and 230° C. After the heat treatment, which results in the disperse dyestuffs being fixed and the dyestuffs of the formula I being destroyed on the areas which have been printed with the discharge reserve printing paste, the textiles are subjected to an after-treatment in the manner customary for polyester, are given a hot and cold rinse and are dried. A particular embodiment of the process according to the invention consists in the padding liquor additionally containing, as well as dyestuffs of the formula I, dyestuffs which are resistant to alkali and are thus not destroyed by the alkaline discharge reserve printing pastes which are to be employed in accordance with the invention. If the procedure followed is in other respects as indicated above, multi-coloured designs are obtained. A further possible means of carrying out the process according to the invention consists in printing, onto the ground which has been padded or printed with dyestuffs of the formula I, discharge reserve printing pastes which, in turn, contain alkali-resistant dyestuffs. Here too, multicoloured designs are obtained if the textile materials are subsequently fixed and finished as described above.

The dyestuffs of the formula I are present in the padding liquors or in the printing pastes in a finely disperse state, such as is customary and known for disperse dyestuffs. The preparation of the padding liquors or printing pastes which are to be employed in accordance with the invention is also effected in a manner which is in itself known by mixing the constituents of the liquors or printing pastes, respectively, with the necessary quantity of water and liquid, finely disperse or solid, redispersible formulations of the dyestuffs of the formula I.

Alkali-resistant disperse dyestuffs which can be combined with the dyestuff of the formula I for the production of multi-coloured designs are the known commercial dyestuffs belonging to the group comprising the azo or azomethine, quinophthalone, nitro or anthraquinone dyestuffs. The following are a few examples of alkali-resistant disperse dyestuffs:

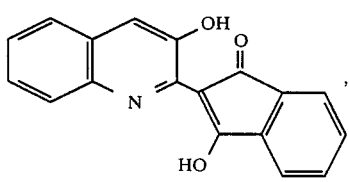

-continued

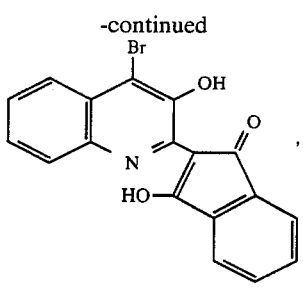

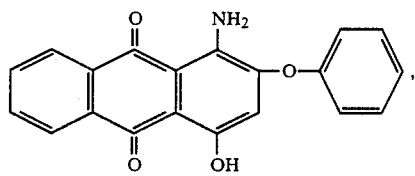

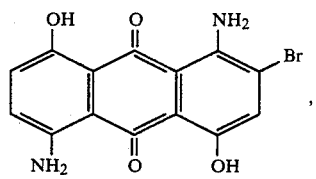

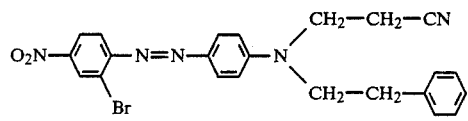

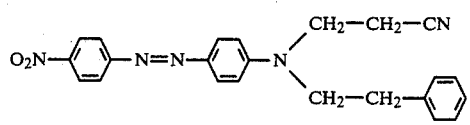

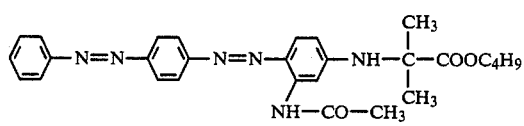

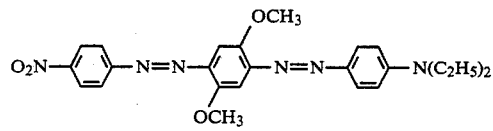

Bases which are present as discharging agents in the discharge reserve printing paste and which produce a pH value of at least 8 in a 5% strength aqueous solution, are known in large numbers. Examples of such bases are the hydroxides of the alkali and alkaline earth metals, salts of alkaline earth and alkali metals with weak organic or inorganic acids, ammonia or aliphatic amines, such as, for example, triethylamine, tripropylamine or tributylamine, ethanolamine, dimethylethanolamine or diethylethanolamine, diethanolamine, methyldiethanolamine, ethyldiethanolamine or propyldiethanolamine or triethanolamine. Bases which are customarily employed are alkaline earth metal hydroxides, such as, for example, calcium hydroxide, alkali metal hydroxides, such as, for example, sodium hydroxide or potassium hydroxide, or alkali metal salts of weak inorganic acids, such as, for example, an alkali metal carbonate or a trialkali metal phosphate. Sodium hydroxide or potassium hydroxide or sodium carbonate or potassium carbonate or sodium bicarbonate or potassium bicarbonate is preferably used as the base in the discharge resist printing pastes.

It is known from German Auslegeschrift No. 1,061,284, to employ the dyestuff of the formula VIII

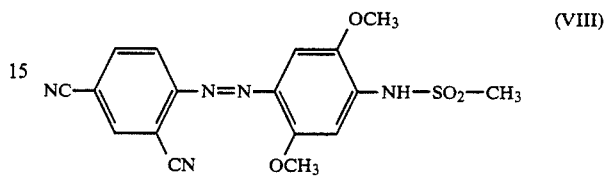

for dyeing polyester fibres, and it is known from British Patent Specification No. 960,662, to dye metal-modified polyalkylene fibres, for example polypropylene fibres, with the dyestuff of the formula IX

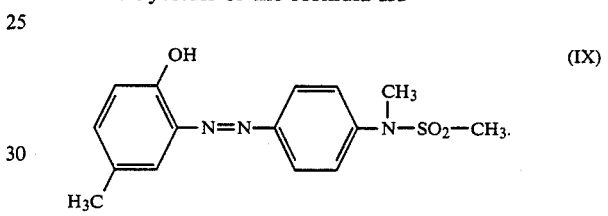

Dyestuffs of the formula I in which D is a radical of the formula III or IV, and also dyestuffs in which K is a radical of the 1,4-naphthylene series, the 2,5-thiazolyl series or the 2,5-thienyl series, are new. Dyestuffs of the formula I in which D is a radical of the formula II, K is a radical of the formula VI and R is phenyl which can optionally be substituted as indicated above, are also new.

The new dyestuffs of the formula I can be prepared by diazotising an amine of the formula D-NH$_2$ in a manner which is in itself known and coupling the product with a sulphonamide of the formulae X, XI, XII or XIII

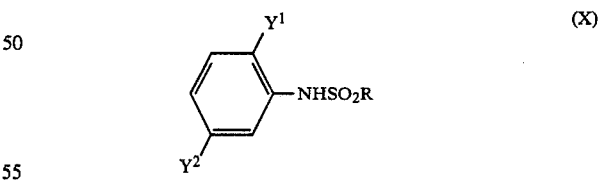

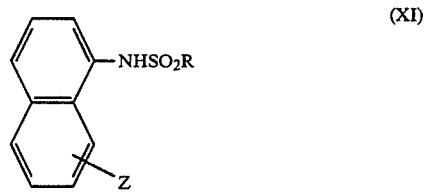

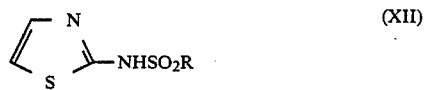

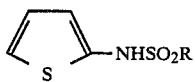

(XIII)

wherein D, $Y^1$, $Y^2$, Z and R have the meanings indicated.

The diazotisation of the amines of the formula $D-NH_2$ can be effected, for example, as follows: 1 to 1.1 equivalents of an aqueous sodium nitrite solution are added to a solution or suspension of the amine in an aqueous strong inorganic acid. The amine can also be dissolved or suspended in an organic acid, such as, for example, acetic acid or propionic acid or a mixture of these acids, and can be diazotised by adding nitrosylsulphuric acid. The resulting solution or suspension of the diazo compound is then combined, at temperatures from $-20°$ to $+30°$ C., preferably $-10°$ to $+10°$ C., with a solution of the coupling component III in water containing an acid and/or a partially or completely water-soluble organic compound, such as, for example, isobutanol or acetone. If necessary, sulphamic acid or urea is added to the coupling solution in order to destroy the excess nitrous acid. After the completion of the coupling, which can, if desired, be facilitated by adding bases, such as, for example, sodium acetate, the dyestuff of the formula I is isolated in the customary manner.

The new dyestuffs, according to the invention, of the formula I can also be prepared by reacting a dyestuff XIV $$D-N=N-K-NH_2 \quad (XIV)$$

with sulphoxylating agents which introduce the radical—$SO_2$—R. The sulphoxylating agents generally employed are halides of sulphonic acids of the formula $$Hal-SO_2-R$$

wherein Hal is a halogen atom and R has the abovementioned meanings.

Preferred sulphoxylating agents are the sulphochlorides $ClSO_2$—R.

The starting dyestuffs required can be prepared in a manner which is in itself known by dazotising a diazo component $D-NH_2$ and subsequently coupling the product with a coupling component $K-NH_2$. The sulphoxylation of the dyestuff XIV with the sulphoxylating agent which introduces the radical —$SO_2$—R, can be carried out at normal or elevated temperature and in the absence, or preferably in the presence, of a solvent. Examples of suitable solvents are pyridine, 1,2-dichloroethane, chlorobenzene or water.

The temperature in the sulphoxylation reaction can be 0° C. up to the reflux temperature of the solvent used. (If appropriate, the excess of sulphoxylating agent can also be used as a solvent). The temperature in the sulphoxylation reaction is normally 0° to 200° C., preferably 20° to 150° C. It is appropriate to stir the mixture during the sulphoxylation reaction, which is normally complete within 5 minutes to 2 hours. In some cases, cooling is necessary in the sulphoxylation reaction.

Sulphoxylating agents which introduce the radical —$SO_2$—R are known or can be prepared readily in accordance with the known specifications.

Mixtures of two or three dyestuffs of the general formula (I) are particularly advantageous from a technical point of view in relation to the dyestuff yield, affinity and fastness of the dyeings or prints. Such dyestuff mixtures, according to the invention, contain 10 to 90%, preferably 30 to 70%, of a particular dyestuff of the formula (I). Such mixtures, according to the invention, can be prepared by reacting two or three dyestuffs of the formula (XIV) with sulphoxylating agents which introduce the radical —$SO_2$—R or, preferably, by reacting one dyestuff of the formula (XIV) simultaneously or successively with two or three different sulphoxylating agents.

The mixtures according to the invention can also be prepared by diazotising two or three amines of the formula $D-NH_2$ and coupling the product with two or three coupling components of the formula $K-NHSO_2R$, these coupling components preferably only differing in respect of the radical R.

The new dyestuffs of the formula I are also excellently suitable for dyeing and printing hydrophobic fibre materials, for example materials made of polyamide, polyacrylonitrile, cellulose 1½-acetate, cellulose triacetate or polyesters. They are applied to these materials by the customary dyeing and printing processes and then produce yellow to reddish-tinged blue dyeings and prints which have a good depth of colour and excellent fastness properties, particularly good fastness to light and good fastness to pleating by dry heat and fixing by dry heat. They are distinguished in this use by low sensitivity to reduction and low heat sensitivity, very good thermal migration behaviour and good build-up capacity and affinity, and, surprisingly, in this respect they are considerably superior to the dyestuff of the formula (VIII) of German Auslegeschrift No. 1,061,284 which is known for the same purpose.

Hydrophobic fibre materials within the meaning of the present invention are materials, particularly textile materials, which consist of synthetic, hydrophobic fibres or which contain these fibres mixed with other fibres, such as, for example, cellulose or wool. Examples of synthetic, hydrophobic fibres are fibres made from polyamide, polyacrylonitrile, cellulose 2½-acetate, cellulose triacetate, and, particularly, polyesters, preferably a polyglycol terephthalate.

Dyeing can be effected in accordance with various known methods. Dyeing can be carried out by the carrier process in the presence of fixing accelerators at temperatures of about 80°–105° C., or by the HT process at temperatures of 110°–140° C.

In the HT process, dyeing is carried out in pressure-resistant dyeing units under the vapour pressure of the dye liquor. It is also possible to carry out dyeing by the thermosol process, in which the goods to be dyed are padded with the dye liquor and, if appropriate, after intermediate drying are passed over heated rollers or through a hot current of air or steam, in the course of which the dyestuff is fixed in the fibre. Temperatures of 180°–230° C. are chiefly used in this process.

The dye liquors are prepared by diluting the necessary quantities of the disperse dyestuffs, in a state of fine division, preferably in the form of liquid or solid dyestuff formulations, with the dyeing medium, preferably with water, until a liquor ratio of 1:5 to 1:50 is produced for the dyeing operation. In addition, further dyeing auxiliaries, such as dispersing auxiliaries, wetting auxiliaries and fixing auxiliaries, are generally added to the liquors.

For textile printing, the necessary quantities of the disperse dyestuffs, in a state of fine division, preferably in the form of liquid or redispersible, solid dyestuff formulations, are kneaded, together with thickeners, such as, for example, alkali metal alginates or the like and, if appropriate, further additives, such as, for example, fixing accelerators, wetting agents and oxidising agents, to form printing pastes.

The textile goods are printed with these printing pastes and, if appropriate, after an intermediate drying process, are subjected to a heat treatment, in the course of which the dyestuff becomes fixed in the fibre.

For this purpose, the printed goods are steamed at temperatures between about 80° and 110° C. in the presence of a carrier or at about 110°–180° C. in the absence of a carrier or are treated at about 180° to 230° C. by the so-called thermofixing process.

EXAMPLE 1

30 parts of the dyestuff of the formula 1

 (1)

are added, in a state of fine division, to a padding liquor containing, per 1,000 parts, 937 parts of water, 3 parts of monosodium phosphate, 10 parts of sodium chlorate and 20 parts of a polymerisation product based on acrylic acid, as an antimigration agent. After drying, the goods are after-printed with a printing paste containing, per 1,000 parts, 600 parts of a 10% strength aqueous locust bean flour ether thickener, 120 parts of water, 80 parts of sodium carbonate, 100 parts of polyethylene glycol 400 and 100 parts of glycerol. After fixing with superheated steam for 7 minutes at 175° C., reductive after-treatment, soaping and subsequent rinsing and drying, a brown print which has very good fastness properties, above all good fastness to light, fixing by dry heat, rubbing and washing, is obtained. A very good white ground with sharp outlines is obtained on the areas on which the printing paste containing sodium carbonate is printed.

The dyestuff used in this example was prepared as follows: A solution of 0.2 mol of 2-amino-5-nitrothiazole which has been diazotised in a mixture of sulphuric acid, acetic acid and propionic acid as specified in the instructions of Example 1 of German Auslegeschrift No. 1,019,415, is added at 0° to 5° C. to a solution of 58.0 g of benzenesulphonic acid 3'-acetylaminoanilide in 320 ml of i-butanol and the mixture is stirred for a further 30 minutes. It is then poured into 3 liters of ice water, stirred thoroughly overnight and filtered and the product is washed with water and dried under reduced pressure. This gives 68.0 g of a black dyestuff powder which melts with decomposition at 216° C.

EXAMPLE 2

20 parts of the dyestuff of the formula 2

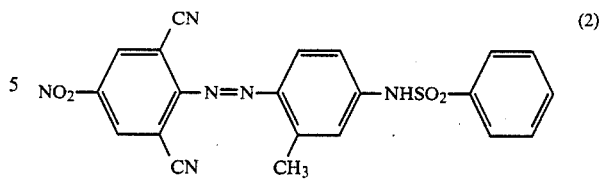 (2)

are used instead of 30 parts of the dyestuff of the formula 1 and the procedure followed is otherwise as indicated in Example 1. This gives a yellow-brown print which has very good coloristic properties, in particular good fastness to light, thermofixing, rubbing and washing, and gives a very good white ground with sharp outlines on the areas which have been discharged.

The dyestuff used in this example was prepared as follows: 60.5 g of 2-cyano-4-nitro-6-bromoaniline in 200 ml of glacial acetic acid and 200 g of sulphuric acid are diazotised at 15°–20° C. with 68.0 g of 41% strength nitrosylsulphuric acid. The diazo solution thus obtained is coupled at 10°–15° C. with 61.8 g of the coupling component of the formula

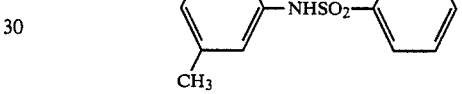

suspended in 500 ml of 75% strength acetic acid, the mixture being thoroughly stirred overnight at room temperature in order to complete the coupling reaction. The product which is precipitated is filtered off, washed with water and dried. 42.8 g of a dyestuff of the formula 3

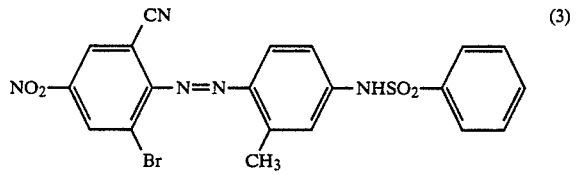 (3)

melting point 218°–20° C., are obtained in this manner in the form of a yellow-brown powder.

10.8 g of copper-I cyanide and 1.2 g of sodium cyanide are stirred in 100 ml of dimethylformamide for 15 minutes and 50 g of the dyestuff of the formula 3 are added. The mixture is then heated to 110°–115° C., stirred at this temperature for 15 minutes and stirred until cold overnight. The dyestuff is then precipitated by means of 300 ml of methanol and is filtered off, rinsed with methanol and water, triturated with a solution of 2.0 g of sodium cyanide in 400 ml of water, filtered off, washed with water until neutral and dried. This gives 31.6 g of a dyestuff of the formula 2, which melts at 248°–50° C.

EXAMPLE 3

20 parts of the dyestuff of the formula 4

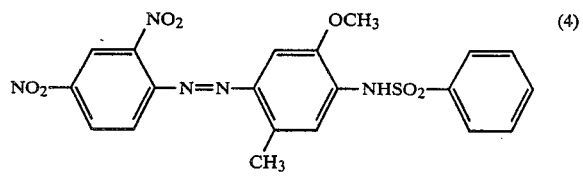

(4)

are used instead of 30 parts of the dyestuff of Example 1 and the procedure followed is otherwise as indicated in Example 1. This gives a brown print which has very good coloristic properties, in particular good fastness to light, fixing by dry heat, rubbing and washing, and gives a very good white ground with sharp outlines on the areas which have been discharged.

The dyestuff used for this example was prepared as follows: 2,4-dinitroaniline is coupled with p-cresidine in the customary manner. 26.5 g of benzenesulphochloride are added to 33.1 g of the product thus obtained, in 500 ml of pyridine at 75° C., and the mixture is stirred for a further 2 hours at this temperature. The mixture is then cooled and poured into ice/hydrochloric acid and the product which is precipitated is filtered off, washed with water, 0.5N hydrochloric acid and again with water and dried. This gives 44.5 g of a dyestuff of the formula 4, melting point 187°–9° C.

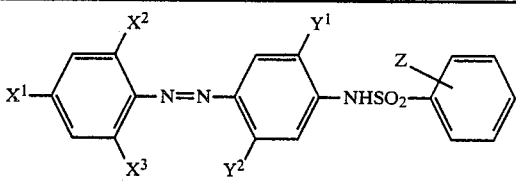

| No. | $X^1$ | $X^2$ | $X^3$ | $Y^1$ |
|---|---|---|---|---|
| 1 | $NO_2$ | CN | CN | H |
| 2 | $NO_2$ | CN | CN | H |
| 3 | $NO_2$ | CN | CN | F |
| 4 | $NO_2$ | $NO_2$ | CN | $O(CH_2)_2OH$ |
| 5 | $NO_2$ | $NO_2$ | CN | H |
| 6 | $NO_2$ | $SO_2CH_3$ | CN | $OCH_3$ |
| 7 | $NO_2$ | $SO_2C_6H_5$ | CN | H |
| 8 | CN | $NO_2$ | CN | $OC_4H_9$ |
| 9 | $COOC_2H_5$ | $COOC_2H_5$ | $NO_2$ | H |
| 10 | $NO_2$ | CN | Cl | $OCH_3$ |
| 11 | $NO_2$ | CN | Cl | $CH_2OH$ |
| 12 | $NO_2$ | CN | Br | H |
| 13 | $NO_2$ | CN | Br | $OCH_2CHOHCH_2OH$ |
| 14 | $NO_2$ | $NO_2$ | Cl | $O(CH_2)_4OH$ |
| 15 | $NO_2$ | $NO_2$ | Cl | H |
| 16 | $NO_2$ | $NO_2$ | Cl | $CH_3$ |
| 17 | $NO_2$ | $NO_2$ | Br | $OCH_2COOCH_3$ |
| 18 | $NO_2$ | $NO_2$ | Br | $(CH_2)_2COOC_2H_5$ |
| 19 | $CF_3$ | $NO_2$ | CN | $OCH_3$ |
| 20 | $CF_3$ | CN | CN | H |
| 21 | $COO(CH_2)_2OH$ | $NO_2$ | Br | $O(CH_2)_2OH$ |
| 22 | $COOCH_3$ | $NO_2$ | Br | $OCH_2CHOHCH_2OH$ |
| 23 | $COC_2H_5$ | $NO_2$ | Br | $OCH_2COOCH_3$ |
| 24 | $COC_6H_5$ | $NO_2$ | Cl | $CH_3$ |
| 25 | $COOC_2H_5$ | $NO_2$ | Cl | H |
| 26 | $COOC_6H_5$ | $NO_2$ | CN | $O(CH_2)_2OCH_3$ |
| 27 | $COOC_3H_7$ | CN | CN | H |
| 28 | $CH_3$ | CN | CN | $O(CH_2)_2OH$ |
| 29 | $C_2H_5$ | $NO_2$ | CN | H |
| 30 | F | CN | CN | H |
| 31 | $4\text{-}NO_2\text{-}C_6H_4\text{-}N=N\text{-}$ | CN | CN | $CH_3$ |
| 32 | $4\text{-}NO_2\text{-}C_6H_4\text{-}N=N\text{-}$ | CN | Cl | $O(CH_2)_2OH$ |
| 33 | $2\text{-}CN\text{-}4\text{-}NO_2\text{-}C_6H_3\text{-}N=N\text{-}$ | CN | Cl | $OCH_3$ |
| 34 | $4\text{-}COOCH_3\text{-}C_6H_4\text{-}N=N\text{-}$ | CN | CN | Cl |
| 35 | $NO_2$ | CN | H | $OCH_3$ |
| 36 | $NO_2$ | CN | H | H |
| 37 | $NO_2$ | $NO_2$ | H | H |
| 38 | $NO_2$ | $NO_2$ | H | $CH_3$ |
| 39 | $NO_2$ | $NO_2$ | H | $O(CH_2)_4OH$ |
| 40 | $NO_2$ | $COOCH_3$ | H | $OCH_3$ |
| 41 | CN | CN | H | $CH_3$ |
| 42 | CN | $NO_2$ | H | $OCH_3$ |
| 43 | $COOCH_3$ | $NO_2$ | H | $OCH_3$ |
| 44 | $COO(CH_2)_2OH$ | $NO_2$ | H | H |
| 45 | $COOC_2H_5$ | CN | H | H |
| 46 | $COCH_3$ | $NO_2$ | H | $CH_2COOCH_3$ |
| 47 | $CO(CH_2)_3OH$ | $NO_2$ | H | $O(CH_2)_2OCH_3$ |
| 48 | $COC_6H_4\text{-}4\text{-}NO_2$ | $NO_2$ | H | $OC_3H_7$ |
| 49 | $COC_6H_4\text{-}4\text{-}NO_2$ | CN | H | $OC_4H_9$ |
| 50 | $CF_3$ | $NO_2$ | H | H |
| 51 | $CF_3$ | CN | H | $O(CH_2)_2Cl$ |
| 52 | $2,4\text{-di-}NO_2\text{-}C_6H_3\text{-}N=N\text{-}$ | CN | H | $C_3H_7$ |
| 53 | $NO_2$ | $NO_2$ | CN | $OCH_3$ |
| 54 | $NO_2$ | $SO_2CH_3$ | CN | Cl |
| 55 | $COOCH_3$ | $NO_2$ | H | H |

-continued

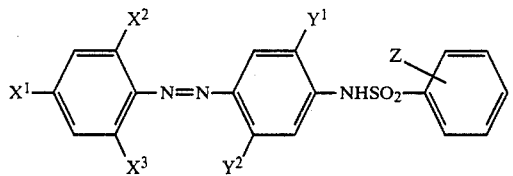

| No. | $X^1$ | | $Y^1$ | $Y^2$* | |
|---|---|---|---|---|---|
| 56 | NO₂ | | CN | CN | O(CH₂)₂COOCH₃ |
| 57 | NO₂ | | SO₂CH₃ | CN | H |
| 58 | NO₂ | | Cl | CN | O(CH₂)₂OH |
| 59 | NO₂ | | Br | CN | H |
| 60 | CN | | NO₂ | CN | OCH₃ |
| 61 | NO₂ | | CN | Cl | O(CH₂)₂OH |
| 62 | NO₂ | | CN | CN | H |
| 63 | COOC₃H₇ | | NO₂ | Br | O(CH₂)₂OH |
| 64 | NO₂ | | CN | CN | OCH₃ |

| No. | Y² | Z | Shade |
|---|---|---|---|
| 1 | CH₃ | H | yellow-brown |
| 2 | NHCOCH₃ | H | scarlet |
| 3 | H | H | golden-yellow |
| 4 | O(CH₂)₂OH | H | scarlet |
| 5 | O(CH₂)₄OH | H | orange |
| 6 | Cl | H | orange |
| 7 | Cl | H | golden-yellow |
| 8 | NHSO₂CH₃ | H | orange |
| 9 | CH₂O(CH₂)₂OH | H | orange |
| 10 | CH₃ | H | yellow-brown |
| 11 | CH₂OH | H | yellow-brown |
| 12 | NHCOCH₂COOCH₃ | H | orange |
| 13 | OCH₂CHOHCH₂OH | H | orange |
| 14 | Cl | H | orange |
| 15 | CH₃ | H | golden-yellow |
| 16 | NHCOC₂H₅ | H | brown |
| 17 | H | H | yellow-brown |
| 18 | (CH₂)₂COOC₂H₅ | H | yellow-brown |
| 19 | OCH₃ | H | orange |
| 20 | NHSO₂C₆H₅ | H | orange |
| 21 | NHCOCH₂OH | H | orange |
| 22 | H | H | yellow-brown |
| 23 | Br | H | yellow-brown |
| 24 | H | H | yellow-brown |
| 25 | NHCOCH₃ | H | orange |
| 26 | NHCOCH₃ | H | scarlet |
| 27 | C(CH₃)₂OH | H | orange |
| 28 | O(CH₂)₂OH | H | golden-yellow |
| 29 | NHCOCH₂OH | H | golden-yellow |
| 30 | NHCOCH₃ | H | orange |
| 31 | H | H | orange |
| 32 | H | H | orange |
| 33 | NHCO(CH₂)₂COOCH₃ | H | scarlet |
| 34 | NHCOCH₃ | H | scarlet |
| 35 | CH₂OH | H | orange |
| 36 | NHCO(CH₂)₃OH | H | orange |
| 37 | O(CH₂)₂COOCH₃ | H | golden-yellow |
| 38 | CH₃ | H | golden-yellow |
| 39 | O(CH₂)₄OH | H | orange |
| 40 | NHCOCH₂COOCH₃ | H | orange |
| 41 | H | H | golden-yellow |
| 42 | Br | H | orange |
| 43 | CH₂OH | H | orange |
| 44 | CH₂O(CH₂)₂OH | H | golden-yellow |
| 45 | NHSO₂C₂H₅ | H | orange |
| 46 | Cl | H | golden-yellow |
| 47 | NHCOC₃H₇ | H | orange |
| 48 | OC₃H₇ | H | orange |
| 49 | CH₃ | H | orange |
| 50 | C₃H₇ | H | golden-yellow |
| 51 | O(CH₂)₂Cl | H | orange |
| 52 | C₃H₇ | H | orange |
| 53 | OCH₃ | 2-NO₂ | scarlet |
| 54 | NHCOCH₃ | 2-NO₂ | scarlet |
| 55 | OCH₃ | 3-NO₂ | golden-yellow |
| 56 | CH₃ | 3-NO₂ | orange |
| 57 | NHSO₂C₆H₅ | 3-NO₂ | orange |
| 58 | NHCOCH₃ | 4-Cl—3-NO₂ | orange |
| 59 | C(CH₃)₂OH | 4-CH₃—3-NO₂ | golden-yellow |
| 60 | Br | 2-CH₃—5-NO₂ | orange |
| 61 | O(CH₂)₂OH | 3,5-di-NO₂—4-CH₃ | orange |
| 62 | NHCO(CH₂)₂OH | 3,5-di-NO₂—4-CH₃ | orange |
| 63 | H | 3,5-di-NO₂—2-CH₃ | golden-yellow |

-continued

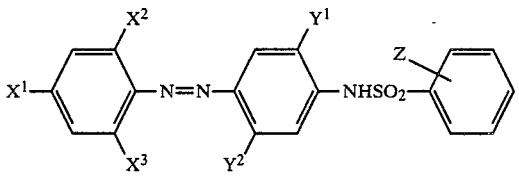

| No. | | | | | | | Shade |
|---|---|---|---|---|---|---|---|
| 64 | OCH₃ | | | 2,4-di-CH₃—3.5-di-NO₂ | | | orange |

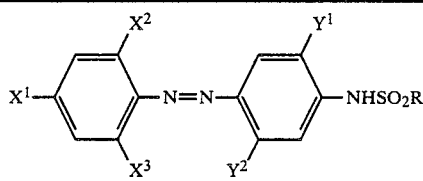

| No. | X¹ | X² | X³ | Y¹ | Y² | R | Shade |
|---|---|---|---|---|---|---|---|
| 65 | NO₂ | NO₂ | CN | OCH₃ | CH₃ | CH₃ | orange |
| 66 | NO₂ | CN | Cl | H | O(CH₂)₂OH | CH₃ | yellow-brown |
| 67 | CN | CN | NO₂ | H | NHCOCH₃ | CH₃ | orange |
| 68 | CH₃ | CN | CN | C₂H₅ | H | CH₃ | golden-yellow |
| 69 | NO₂ | NO₂ | Br | Cl | NHCOCH₂OH | CH₃ | brown |
| 70 | COOC₂H₅ | NO₂ | Cl | OCH₃ | OCH₃ | CH₃ | brown |
| 71 | CN | CN | H | O(CH₂)₄OH | Cl | CH₃ | yellow-brown |
| 72 | NO₂ | CN | CN | O(CH₂)₂COOCH₃ | NHCOC₃H₇ | C₂H₅ | scarlet |
| 73 | NO₂ | CN | Br | CH₂OH | CH₂OH | C₂H₅ | yellow-brown |
| 74 | NO₂ | NO₂ | Cl | H | Cl | C₂H₅ | golden-yellow |
| 75 | CF₃ | CN | CN | O(CH₂)₂OH | O(CH₂)₂OH | C₂H₅ | scarlet |
| 76 | C₆H₅—SO₂ | NO₂ | Cl | C₂H₅ | H | C₂H₅ | orange |
| 77 | NO₂ | SO₂CH₃ | CN | Br | Br | C₂H₅ | orange |
| 78 | CH₃CO | NO₂ | Cl | H | CH₃ | C₃H₇ | orange |
| 79 | NO₂ | CN | CN | C₂H₅ | C₂H₅ | C₃H₇ | orange |
| 80 | COOCH₃ | NO₂ | H | CH₃ | NHCOCH₂O(CH₂)₂OH | C₃H₇ | orange |
| 81 | NO₂ | NO₂ | H | Br | H | C₃H₇ | golden-yellow |
| 82 | NO₂ | NO₂ | Cl | OC₂H₅ | C(CH₃)₂OH | C₃H₇ | orange |
| 83 | SO₂C₂H₅ | NO₂ | H | CH₂OH | BR | C₃H₇ | yellow-brown |
| 84 | NO₂ | NO₂ | CN | OCH₃ | OCH₃ | C₃H₇ | scarlet |
| 85 | NO₂ | SO₂CH₃ | CN | O(CH₂)₂OH | H | CH=CH₂ | orange |
| 86 | CN | CN | H | Cl | H | CH=CH₂ | golden-yellow |
| 87 | CF₃ | NO₂ | Br | O(CH₂)₂COOCH₃ | O(CH₂)₂COOCH₃ | CH=CH₂ | orange |
| 88 | COO(CH₂)₂OH | NO₂ | H | H | NHCO(CH₂)₂OH | CH=CH₂ | orange |
| 89 | NO₂ | SO₂CH₃ | CN | H | CH₂OH | CH=CH₂ | yellow-brown |
| 90 | NO₂ | CN | CN | H | F | CH₂Cl | golden-yellow |
| 91 | NO₂ | COOCH₃ | Cl | CH₃ | NHCOCH₂Cl | CH₂Cl | orange |
| 92 | C₂H₅ | CN | CN | CHOHCH₃ | Cl | CH₂Cl | golden-yellow |
| 93 | NO₂ | CN | Cl | O(CH₂)₂O(CH₂)₂OH | H | CH₂Cl | golden-yellow |
| 94 | NO₂ | CN | Br | H | NHCOCH₂COOC₂H₅ | (CH₂)₂Cl | orange |
| 95 | NO₂ | NO₂ | Cl | Cl | Cl | (CH₂)₂Cl | golden-yellow |
| 96 | COCH₃ | NO₂ | Cl | OC₂H₅ | CH₃ | (CH₂)₂Cl | orange |
| 97 | NO₂ | SO₂C₂H₅ | CN | O(CH₂)₂OH | NHCOC₃H₇ | (CH₂)₂Cl | scarlet |
| 98 | SO₂C₆H₅ | NO₂ | CN | H | O(CH₂)₄OH | (CH₂)₂OH | orange |
| 99 | NO₂ | NO₂ | CN | OCH₃ | Br | (CH₂)₂OH | golden-yellow |
| 100 | NO₂ | CN | H | CHOHCH₃ | H | (CH₂)₂OH | golden-yellow |
| 101 | NO₂ | NO₂ | CN | Br | Br | (CH₂)₂OH | golden-yellow |
| 102 | CH₃ | CN | CN | H | NHCO(CH₂)₂OH | (CH₂)₂OH | golden-yellow |
| 103 | CN | CN | H | C₂H₅ | NHCOCH₂OH | CH₂CHOHCH₂Cl | orange |
| 104 | COC₆H₅ | NO₂ | Cl | O(CH₂)₂OCOCH₃ | H | CH₂CHOHCH₂Cl | orange |
| 105 | NO₂ | SO₂C₂H₅ | CN | O(CH₂)₂OH | O(CH₂)₂OH | CH₂CHOHCH₂Cl | scarlet |

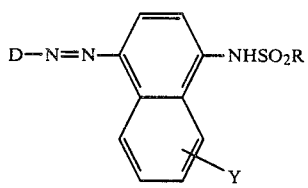

| No. | D | Y | R | Shade |
|---|---|---|---|---|
| 106 | 2,4-di-NO₂—C₆H₃— | H | C₆H₅ | orange |

-continued

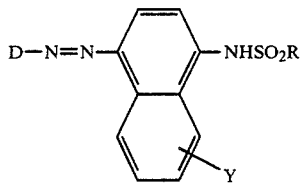

| No. | D | Y | R | Shade |
|---|---|---|---|---|
| 107 | 2,6-di-CN—4-NO$_2$—C$_6$H$_2$— | H | C$_6$H$_5$ | orange |
| 108 | 2-NO$_2$—4-COOC$_2$H$_5$—C$_6$H$_2$— | 8-Cl | C$_6$H$_5$ | golden-yellow |
| 109 | 5-NO$_2$—thiazol-2-yl | H | C$_6$H$_5$ | orange |
| 110 | 5-NO$_2$—thiazol-2-yl | 5-OCH$_3$ | 2-NO$_2$—C$_6$H$_4$ | orange |
| 111 | 6-NO$_2$—benzthiazol-2-yl | H | C$_2$H$_5$ | orange |
| 112 | 3-COOC$_2$H$_5$—5-NO$_2$—thiazol-2-yl | H | C$_6$H$_5$ | orange |
| 113 | 2-CN—4-NO$_2$—C$_6$H$_5$— | 6-COOCH$_3$ | CH$_2$CH$_2$OH | golden-yellow |
| 114 | 2-NO$_2$—4-COOCH$_3$—C$_6$H$_5$— | H | 3-NO$_2$—C$_6$H$_4$ | golden-yellow |
| 115 | 2,4-di-NO$_2$—6-Cl—C$_6$H$_2$— | H | CH$_3$ | golden-yellow |

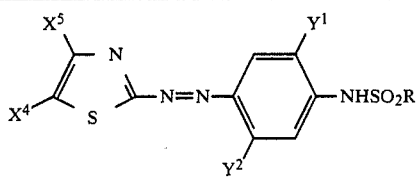

| No. | X$^4$ | X$^5$ | Y$^1$ | Y$^2$ | R | Shade |
|---|---|---|---|---|---|---|
| 116 | NO$_2$ | H | H | CH$_3$ | C$_6$H$_5$ | yellow-brown |
| 117 | NO$_2$ | H | H | O(CH$_2$)$_2$COOCH$_3$ | C$_6$H$_5$ | orange |
| 118 | NO$_2$ | H | OCH$_3$ | CH$_3$ | 2-NO$_2$—C$_6$H$_4$ | orange |
| 119 | NO$_2$ | H | O(CH$_2$)$_4$OH | O(CH$_2$)$_4$OH | C$_2$H$_5$ | scarlet |
| 120 | NO$_2$ | H | O(CH$_2$)$_2$OH | NHCOCH$_3$ | C$_6$H$_5$ | scarlet |
| 121 | NO$_2$ | H | CH$_3$ | NHCO(CH$_2$)$_3$OH | C$_6$H$_5$ | scarlet |
| 122 | NO$_2$ | CH$_3$ | H | NHCO(CH$_2$)$_2$COOC$_2$H$_5$ | C$_6$H$_5$ | scarlet |
| 123 | NO$_2$ | CH$_3$ | Cl | Cl | (CH$_2$)$_2$OH | orange |
| 124 | NO$_2$ | C$_6$H$_5$ | O(CH$_2$)$_4$OH | Cl | C$_6$H$_5$ | orange |
| 125 | COOCH$_3$ | H | H | CH$_2$OH | C$_6$H$_5$ | golden-yellow |
| 126 | COOC$_3$H$_7$ | H | H | NHSO$_2$—2-NO$_2$—C$_6$H$_5$ | C$_6$H$_5$ | orange |
| 127 | CN | H | O(CH$_2$)$_2$COOCH$_3$ | H | C$_6$H$_5$ | orange |
| 128 | CN | H | CH$_2$OH | CH$_2$OH | CH$_2$CHOHCH$_2$Cl | orange |
| 129 | SO$_2$CH$_3$ | H | OCH$_3$ | CH$_2$O(CH$_2$)$_2$OH | C$_6$H$_5$ | orange |
| 130 | SO$_2$C$_6$H$_5$ | H | H | OCH$_2$CHOHCH$_2$OH | C$_6$H$_5$ | golden-yellow |

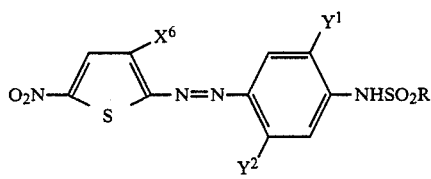

| No. | X$^6$ | Y$^1$ | Y$^2$ | R | Shade |
|---|---|---|---|---|---|
| 131 | H | H | O(CH$_2$)$_2$COOH | C$_6$H$_5$ | golden-yellow |
| 132 | Cl | OC$_2$H$_5$ | C$_2$H$_5$ | 3-NO$_2$—C$_6$H$_5$ | orange |
| 133 | Br | Cl | Cl | C$_6$H$_5$ | golden-yellow |
| 134 | Br | C(CH$_3$)$_2$OH | C(CH$_3$)$_2$OH | C$_6$H$_5$ | golden-yellow |
| 135 | CN | OC$_2$H$_5$ | OC$_2$H$_5$ | ClCH$_2$ | scarlet |
| 136 | SO$_2$CH$_3$ | H | NHCOCH$_3$ | C$_6$H$_5$ | scarlet |
| 137 | NO$_2$ | O(CH$_2$)$_2$OH | NHCOC$_4$H$_9$ | 3,5-di-NO$_2$—4-CH$_3$ | scarlet |
| 138 | NO$_2$ | OCH$_3$ | CH$_3$ | C$_6$H$_5$ | orange |
| 139 | COOCH$_3$ | H | O(CH$_2$)$_2$COOC$_2$H$_5$ | C$_2$H$_5$ | orange |

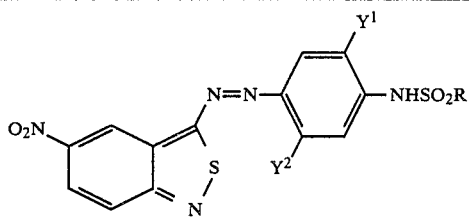

| No. | Y¹ | Y² | R | Shade |
|---|---|---|---|---|
| 140 | H | NHCOCH$_3$ | C$_6$H$_5$ | scarlet |
| 141 | H | O(CH$_2$)$_4$OH | CH$_3$ | orange |
| 142 | OCH$_3$ | Cl | C$_6$H$_5$ | scarlet |
| 143 | (CH$_2$)$_3$OH | (CH$_2$)$_3$OH | 3-NO$_2$—4-CH$_3$—C$_6$H$_3$ | orange |
| 144 | Br | Br | C$_6$H$_5$ | orange |
| 145 | O(CH$_2$)$_2$OCOCH$_3$ | NHCOCH$_2$OH | CH=CH$_2$ | scarlet |
| 146 | OCH$_2$COOCH$_3$ | H | C$_6$H$_5$ | orange |
| 147 | CH$_3$ | NHCOCH$_2$Cl | C$_6$H$_5$ | scarlet |
| 148 | OCH(CH$_3$)$_2$ | Cl | CH$_3$ | orange |
| 149 | H | F | C$_3$H$_7$ | golden-yellow |
| 150 | OCH$_3$ | OCH$_3$ | C$_6$H$_5$ | orange |
| 151 | H | NHCO(CH$_2$)$_3$OH | C$_6$H$_5$ | orange |

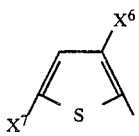

| No. | D | R | Shade |
|---|---|---|---|
| 152 | 5-NO$_2$—thiazol-2-yl | C$_6$H$_5$ | scarlet |
| 153 | 5-NO$_2$—thiazol-2-yl | C$_2$H$_5$ | scarlet |
| 154 | 5-NO$_2$—thiazol-2-yl | 3-NO$_2$—C$_6$H$_4$ | scarlet |
| 155 | 5-NO$_2$—benzisothiazol-3-yl | C$_6$H$_5$ | scarlet |
| 156 | 2,6-di-CN—4-NO$_2$—C$_6$H$_2$— | C$_3$H$_7$ | orange |
| 157 | 2-CN—4-NO$_2$—6-Cl—C$_6$H$_2$— | C$_6$H$_5$ | orange |

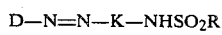

| No. | D | R | Shade |
|---|---|---|---|
| 158 | 5-NO$_2$—thien-2-yl | C$_6$H$_5$ | scarlet |
| 159 | 5-NO$_2$—thien-2-yl | CH$_3$ | scarlet |
| 160 | 2-NO$_2$—4-COOCH$_3$—C$_6$H$_3$— | CH$_2$CH$_2$Cl | orange |
| 161 | 2,4-di-NO$_2$—6-Cl—C$_6$H$_2$— | C$_6$H$_5$ | orange |
| 162 | 5-NO$_2$—thiazol-2-yl | CH$_2$CH$_2$OH | scarlet |

What is claimed is:

1. Azo dyestuff free from groups imparting solubility in water and having the formula

D—N=N—K—NHSO$_2$R wherein D is the formula

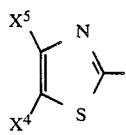

or the formula $$\begin{array}{c} X^6 \\ \diagup \\ X^7 \diagdown S \diagup \end{array}$$

wherein $X^4$ is nitro; cyano; alkylsulphonyl having 1 to 4 carbon atoms in the alkyl moiety; phenylsulphonyl; phenylsulphonyl substituted by methoxy, methyl, chloro, bromo or nitro; alkoxycarbonyl having 1 to 4 carbon atoms in the alkyl moiety; phenoxycarbonyl; or phenoxycarbonyl substituted in the phenyl moiety by alkyl having 1 to 4 carbon atoms, alkoxy having 1 to 4 carbon atoms, nitro, fluoro, chloro, or bromo;

$X^5$ is hydrogen; alkyl having 1 to 4 carbon atoms; phenyl; or phenyl substituted by alkyl having 1 to 4 carbon atoms, alkoxy having 1 to 4 carbon atoms, nitro or halogen;

$X^6$ is bromo; chloro; nitro; cyano; alkoxycarbonyl having 1 to 4 carbon atoms in the alkyl moiety; alkylcarbonyl having 1 to 4 carbon atoms in the alkyl moiety; or alkylsulphonyl having 1 to 4 carbon atoms in the alkyl moiety, $X^7$ is nitro; cyano; bromo; chloro, alkylsulphonyl having 1 to 4 carbon atoms in the alkyl moiety; or alkoxycarbonyl having 1 to 4 carbon atoms in the alkoxy moiety;

K is a 1,4-phenylene; a 1,4-naphthylene; a 2,5-thiazolylene; or a 2,5-thienylene component; and R is alkyl having 1 to 8 carbon atoms; alkyl having 1 to 8 carbon atoms monosubstituted by a monosubstituent selected from the group of hydroxyl, chloro, bromo, cyano, alkoxy having 1 to 4 carbon atoms, hydroxyalkoxy having 1 to 4 carbon atoms, alkenoxy having 3 to 4 carbon atoms, cycloalkoxy having 5 to 6 carbon atoms, alkylcarbonyloxy having 2 to 4 carbon atoms, phenyl, phenoxy and benzoyloxy, with said phenyl, phenoxy and benzoyloxy being unsubstituted or substituted in the phenyl nucleus by alkyl having 1 to 4 carbon atoms, alkoxy having 1 to 4 carbon atoms, chloro, bromo or cyano; disubstituted alkyl having 1 to 8 carbon atoms substituted by hydroxyl and one of said monosubstituents; alkenyl having 2 to 4 carbon atoms; alkenyl having 2 to 4 carbon atoms substituted by hydroxyl, methoxy, ethoxy, chloro, bromo or cyano; phenyl; or phenyl substituted by alkyl having 1 to 4 carbon atoms, hydroxyalkyl having 1 to 4 carbon atoms, alkoxyalkyl having a total of 2 to 8 carbon atoms, hydroxyalkoxyalkyl having a total of 2 to 8 carbon atoms, alkanoyloxyalkyl having a total of 2 to 8 carbon atoms, alkoxy having 1 to 4 carbon atoms, hydroxyalkoxy having 1 to 4 carbon atoms, alkoxyalkoxyalkoxy having a total of 2 to 8 carbon atoms, hydroxyalkoxyalkoxy having a total of 2 to 8 carbon atoms, alkanoyloxyalkoxy having a total of 2 to 8 carbon atoms, chloro, bromo or nitro.

2. Azo dyestuff according to claim 1 free from groups imparting solubility in water wherein K is a 1,4-naphthylene, a 2,5-thiazolylene or a 2,5-thienylene.

3. Azo dyestuff free from groups imparting solubility in water and having the formula $$D-N=N-K-NHSO_2R$$

wherein D is the formula

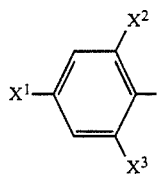

wherein $X^1$ and $X^2$ independently of one another are each halogen; nitro; cyano; trifluoromethyl; alkyl having 1 to 4 carbon atoms; alkyl having 1 to 4 carbon atoms substituted by hydroxyl, methoxy, ethoxy, hydroxyethoxy, methoxyethoxy, ethoxyethoxy, chloro, bromo or cyano; alkylsulphonyl having 1 to 4 carbon atoms; alkoxysulphonyl having 1 to 4 carbon atoms substituted by hydroxyl, methoxy, ethoxy, hydroxyethoxy, methoxyethoxy, ethoxyethoxy, chloro, bromo or cyano; phenylsulphonyl; phenylsulphonyl substituted by methoxy, methyl, chloro, bromo or nitro; alkylcarbonyl having 1 to 4 carbon atoms in the alkyl moiety; alkylcarbonyl having 1 to 4 carbon atoms in the alkyl moiety substituted by hydroxyl, methoxy, ethoxy, hydroxyethoxy, methoxyethoxy, ethoxyethoxy, chloro, bromo or cyano; benzoyl; benzoyl with the phenyl moiety substituted by alkyl having 1 to 4 carbon atoms, alkoxy having 1 to 4 carbon atoms, nitro or halogen; alkoxycarbonyl having 1 to 4 carbon atoms in the alkoxy moiety; alkoxycarbonyl having 1 to 4 carbon atoms in the alkoxy moiety substituted by phenyl, hydroxyl, alkoxy having 1 to 4 carbon atoms or alkylcarbonyloxy having 1 to 4 carbon atoms in the alkyl moiety; phenylazo; or phenylazo substituted by cyano, nitro, chloro, bromo, trifluoromethyl, alkyl having 1 to 4 carbon atoms, alkoxy having 1 to 4 carbon atoms or alkoxycarbonyl having 1 to 4 carbon atoms in the alkoxy moiety; and $X^3$ is hydrogen or has one of the meanings of $X^1$;

K is the formula

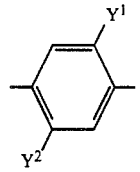

wherein $Y^1$ is hydrogen; halogen; alkyl having 1 to 4 carbon atoms; alkyl having 1 to 4 carbon atoms substituted by halogen, cyano, hydroxyl, alkanoyloxy having 1 to 4 carbon atoms, alkoxy having 1 to 4 carbon atoms or alkoxycarbonyl having 1 to 4 carbon atoms in the alkoxy moiety; alkoxy having 1 to 4 carbon atoms; alkoxy having 1 to 4 carbon atoms monosubstituted by halogen, cyano, hydroxyl, alkoxy having 1 to 4 carbon atoms, hydroxyalkoxy having 1 to 4 carbon atoms, alkanoyloxy having 1 to 4 carbon atoms, or alkoxycarbonyl having 1 to 4 carbon atoms in the alkoxy moiety; or alkoxy having 1 to 4 carbon atoms disubstituted by two hydroxyls or by a hydroxyl and a chloro; and $Y^2$ is alkylcarbonylamino having 1 to 4 carbon atoms in the alkyl moiety; alkylcarbonylamino having 1 to 4 carbon atoms in the alkyl substituted by chloro, bromo, hydroxyl, alkoxy having 1 to 4 carbon atoms, hydroxyalkoxy having 1 to 4 carbon atoms, alkanoyloxy having 1 to 4 carbon atoms, phenoxy or alkoxycarbonyl having 1 to 4 carbon atoms; benzoylamino; benzoylamino monosubstituted or disubstituted in the phenyl nucleus by hydroxyl, chloro, alkyl having 1 to 4 carbon atoms, or alkoxy having 1 to 4 carbon atoms; alkylsulphonylamino having 1 to 4 carbon atoms; alkylsulphonylamino having 1 to 4 carbon atoms; alkylsulphonylamino having 1 to 4 carbon atoms substituted by hydroxyl or alkoxy having 1 to 4 carbon atoms; phenylsulphonylalkylsulphonylamino having 1 to 4 carbon atoms substituted by hydroxyl or alkoxy having 1 to 4 carbon atoms; phenylsulphonylamino; phenylsulphonylamino monosubstituted or disubstituted in the phenyl nucleus by hydroxyl, chloro, alkyl having 1 to 4 carbon atoms, or alkoxy having 1 to 4 carbon atoms; or a moiety from the definition of $Y^1$; and R is phenyl which can be trisubstituted, disubstituted or monosubstituted by methyl, ethyl, methoxy, ethoxy, chloro, bromo or nitro.

* * * * *